UNITED STATES PATENT OFFICE.

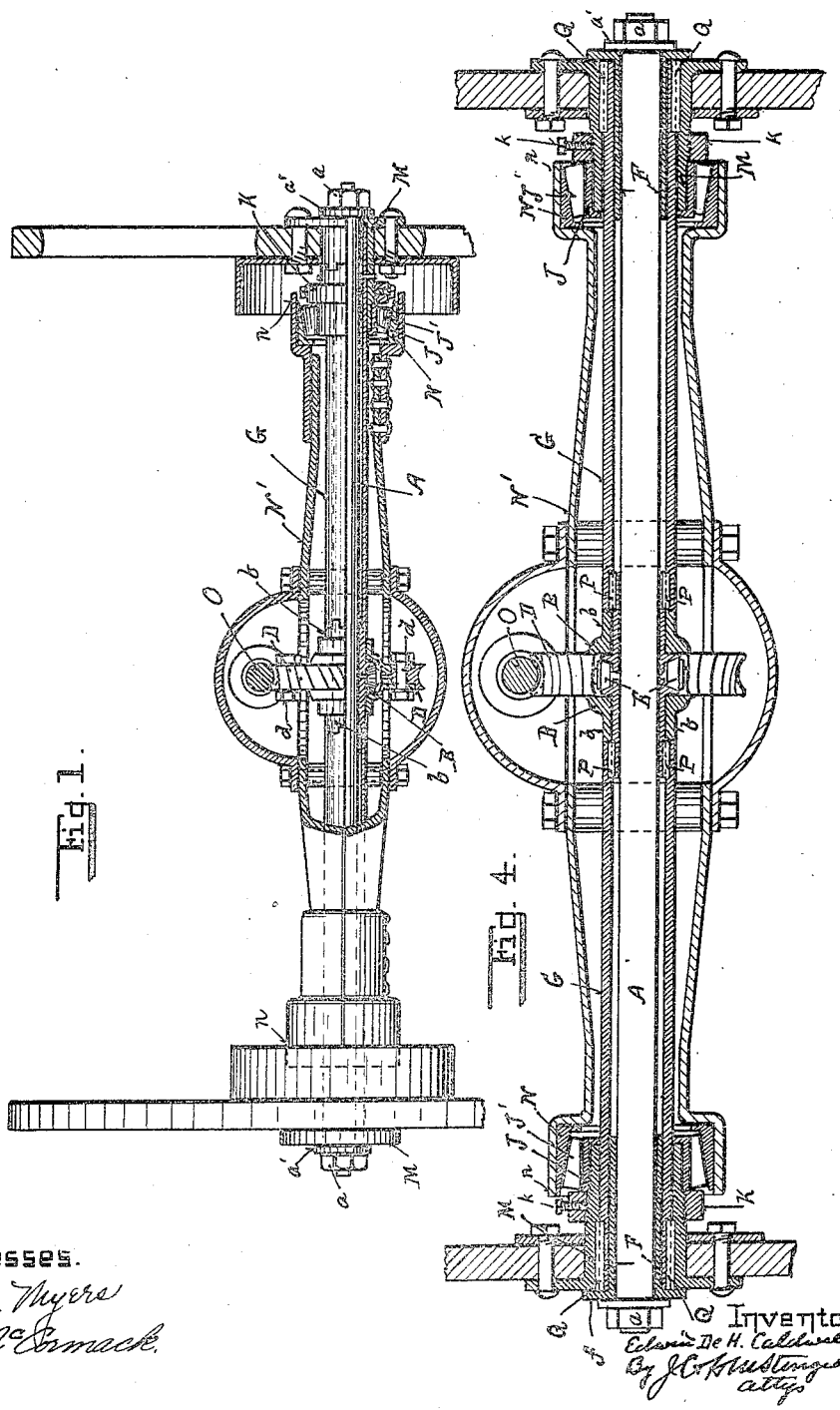

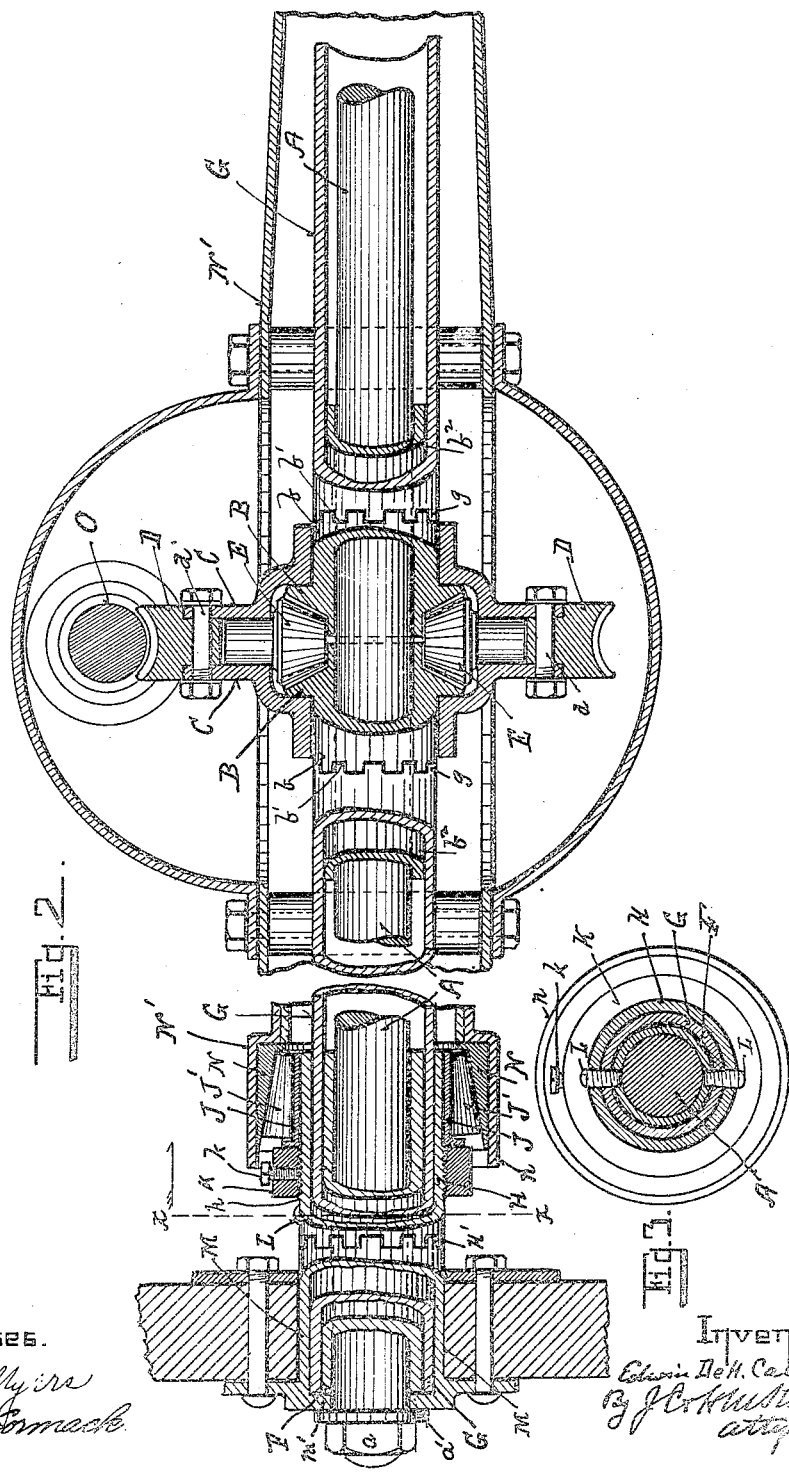

EDWIN DE H. CALDWELL, OF DUNKIRK, NEW YORK.

MOTOR-VEHICLE AXLE.

1,130,065.  Specification of Letters Patent.  Patented Mar. 2, 1915.

Application filed January 13, 1914. Serial No. 811,873.

*To all whom it may concern:*

Be it known that I, EDWIN DE H. CALDWELL, a citizen of the United States, residing at Dunkirk, in the county of Chautauqua and State of New York, have invented certain new and useful Improvements in Motor-Vehicle Axles; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to axles for motor-vehicles, and particularly to the rear or driving axle of such vehicles.

The object of my invention is to eliminate from such axle the journal bearings commonly employed to support the differential gear in the intermediate portion of the axle. This I accomplish by providing a rod or shaft which extends from one wheel to the other wheel, entirely through the axle, upon which the differential gear may be supported, and which rod or shaft, while securing the drive wheels in place, does not drive said wheels, but is free to rotate with them, not being keyed or otherwise locked thereto. These and other features of my invention are hereinafter fully explained and pointed out, and are illustrated in the accompanying drawings in which :—

Figure 1, is a rear view, partly in elevation, and partly in longitudinal central section, of a motor vehicle axle embodying my invention. Fig. 2, is an enlarged view of a portion of a motor vehicle axle partially in elevation and partially in longitudinal central section, with portions thereof broken away. Fig. 3, is a transverse section of the same on the line $x$—$x$ in Fig. 2. Fig. 4, is a longitudinal central section of a motor vehicle axle embodying my invention, showing an alternative construction of the same.

In these drawings A, indicates a rod or shaft, which extends entirely through the axle mechanism from one wheel to the other, and is provided on its ends with nuts $a$, and washers $a'$. On the intermediate portion of the rod A, I place the miter gear wheels B B, of a differential gear, which wheels B B, are provided with hubs $b$; these hubs $b$, are shown in Figs. 1 and 2, as being provided with notches $b'$, at the outer ends thereof. Upon the hubs $b$, of the miter gear wheels B B, I place the supporting disks C C, of the worm gear D, between which are journaled miter pinions E, which intermesh with the two miter gear wheels B B, in the usual manner. The supporting disks C C, are secured together against the worm gear ring D, by means of bolts $d$.

It is, of course evident from the foregoing and from the drawings, that the several parts of the differential gear shown and described, must be assembled upon the hubs $b$, of the miter gears B, and that thereafter the rod A, can be inserted therethrough, if desired. Upon the rod A, outside of the notched hubs $b$ $b$, I place sleeves $b^2$ $b^2$, which sleeves are shown in these drawings as integral with the hubs $b$ $b$, or they may extend entirely through both hubs $b$ $b$, in the form of a bushing, if desired. Upon the outer ends of the rod A, I place short sleeves F, and upon the sleeves F, and the sleeves $b^2$, I place hollow drive shafts G G, which are preferably provided with teeth $g$, on their inner ends, which engage the notches $b'$, on the hubs $b$, so that said hollow drive shafts are engaged by said hubs as by "dental clutches", and are thereby caused to rotate by said miter gear wheels B B. The hollow shafts G G, extend from the hubs $b$ $b$, to the outer ends of the sleeves F F, on the rod A. Upon the hollow shafts G G, adjacent to the outer end of each, I place an outer sleeve H, which is preferably provided with dental-clutch teeth H', on its outer end, and with circumferential screw threads $h$, around an intermediate portion thereof. Upon the inner ends of these outer sleeves H, I place cones J, for the anti-friction rollers J', and upon the screw threads $h$, I place a screw collar K, by means of which the cones J, may be adjusted longitudinally of the hollow shaft G. The collar K, is also preferably provided with a set screw $k$, for locking it against rotation. The sleeves H, and F, and hollow shafts G, are locked preferably together by means of screw pins L, (see Fig. 3) so that they will all turn together. Upon the outer ends of the hollow shafts G, I place hubs M, of vehicle wheels, the inner ends of which hubs are provided with teeth m, to engage the dental clutch teeth H', on the outer sleeve H. The hub M, is also provided with an inturned flange m', to engage the ends of the hollow shaft G, and inner sleeve F, on its inner face, and the washer a', on its outer face, so that when the nut a, and washer a', are in place on the ends of the rod A, all of the parts hereinbefore described, viz:—the wheel hubs M, hollow shafts G, and differential hubs b, will be held in engagement.

Mounted upon anti-friction rollers J', I place a cup N, which is inclosed within each end n, of the tubular axle housing N', the intermediate portion of which housing is enlarged sufficiently to receive the differential gear worm wheel D. Within the housing N', I mount a driving worm O, which intermeshes with the worm wheel D, in the usual manner.

While I have shown a worm drive in these drawings, it is, of course evident to a mechanic skilled in the art, that any other suitable type of driving gear may be employed as may be desired, without departing from the spirit of my invention.

In Fig. 4, I have shown an alternative construction of mechanism embodying my invention, in which I have substituted keys P, between the hubs b, of the miter gears B, and the hollow shaft G, for the dental clutch teeth b', and the keys Q, between tl outer ends of the hollow shafts G, and the wheel hubs M, and have eliminated the outer sleeve H, shown in Figs. 1, 2 and 3, and extended the wheel hub M, inwardly sufficiently to mount the cones J, and screw collars K, directly thereon, thus eliminating the dental clutch teeth H', and screw-pins L. In this alternative construction the inner sleeve F, is provided with a radial flange f, on its outer end, which abuts against the outer end of the wheel hub M, so as to prevent the sleeve F, from moving inward on the rod A, and the washer a, and nut a', prevents the sleeve F, hollow shaft G, and wheel hub M, from moving longitudinally out of the housing N'.

From the foregoing it will be evident that by means of the longitudinally adjustable screw-collars K, the longitudinal position of the worm wheel D, with relation to the worm O, can be adjusted as may be desired.

From the foregoing description of the construction of my invention, the operation thereof is believed to be so obvious that further description thereof is unnecessary. It will also be obvious that the differential gear is entirely supported upon the rod A, and that the power of the motor is transmitted to the vehicle wheels only through the hollow shaft G.

Having thus fully shown and described my invention so as to enable others to utilize the same, what I claim as new and desire to secure by Letters-Patent, is:—

1. The combination in a motor vehicle axle, of a rod, a vehicle wheel loosely secured on each end thereof, a pair of inwardly facing bevel gears rotatably supported on said rod, tubular hubs on said bevel gears extending outwardly therefrom, a gear wheel mounted on the hubs of said bevel gear wheels and adapted to prevent said gears from spreading apart, bevel gear pinions journaled in said gear wheel and intermeshing with said bevel gear wheels, and tubular shafts inclosing said rod and non-rotatably engaging said tubular hubs, and said vehicle wheels, substantially as set forth.

2. The combination in a motor vehicle axle, of a rod extending therethrough, a pair of inwardly facing bevel gears rotatably supported on said rod, tubular hubs on said bevel gears extending outwardly therefrom, a gear wheel journaled on said tubular hubs and adapted to prevent said bevel gears from spreading apart, bevel gear pinions journaled in said gear wheel and intermeshing with said inwardly facing bevel gear wheels, a sleeve on each end of said rod, hollow shafts inclosing said rod at each side of and non-rotatably engaging said tubular hubs, a vehicle wheel non-rotatably secured on the outer end of each of said hollow shafts, a tubular axle housing inclosing said gears and hollow shafts, and journal bearings in the ends of said tubular axle housing adapted to support the same in spaced relation to said hollow shafts and gears, substantially as set forth.

3. The combination in a motor vehicle axle, of a rod extending therethrough, a differential gear mechanism supported thereon, vehicle wheels on the ends of said rod, means to retain said wheels thereon, a hollow shaft at each side of and non-rotatably engaging said differential gear, and said vehicle wheels, a tubular housing inclosing said differential gear and hollow shafts, journal bearings in the ends thereof adapted to maintain said housing in concentric spaced relation to said shafts, and means adapted to adjust said housing longitudinally with relation to said hollow shafts and differential gear, substantially as set forth.

4. The combination in a motor vehicle axle, of a rod extending therethrough, a pair of inwardly facing bevel gear wheels on said rod, tubular hubs on said bevel gear wheels extending outwardly therefrom, a gear wheel mounted on the hubs of said bevel gear wheels, bevel gear pinions journaled in said gear wheel and intermeshing with said bevel gear wheels on said rod, hollow shafts on said rod non-rotatably engaging each of said bevel gear wheel hubs, vehicle wheels non-rotatably secured on the outer ends of each of said hollow shafts, and means on the ends of said rod to retain said vehicle wheels, hollow shafts, and bevel gear hubs in engagement, substantially as set forth.

5. The combination in a motor vehicle axle, of a rod extending therethrough, a differential gear supported thereon, a hollow shaft supported in concentric spaced relation to said rod, and non-rotatably engaging one side of said differential gear, a vehicle wheel on said hollow shaft, inwardly projecting teeth on the hub of said wheel, a sleeve rotatably secured on said hollow shaft, teeth thereon engaging said inwardly projecting teeth on the hub of said vehicle wheel, means on the end of said rod to retain said teeth in engagement, a tubular housing inclosing said differential gear and hollow shaft, and journal bearing mechanism in the end of said housing to maintain said housing in concentric spaced relation to said hollow shaft, substantially as set forth.

In testimony whereof I affix my signature, in presence of two witnesses.

EDWIN DE H. CALDWELL.

Witnesses:
P. V. GIFFORD,
H. M. STURGEON.